Jan. 21, 1958         H. W. DAVIS         2,820,493
STUMP CUTTING ATTACHMENT FOR A TRACTOR
Filed March 1, 1957         2 Sheets-Sheet 2
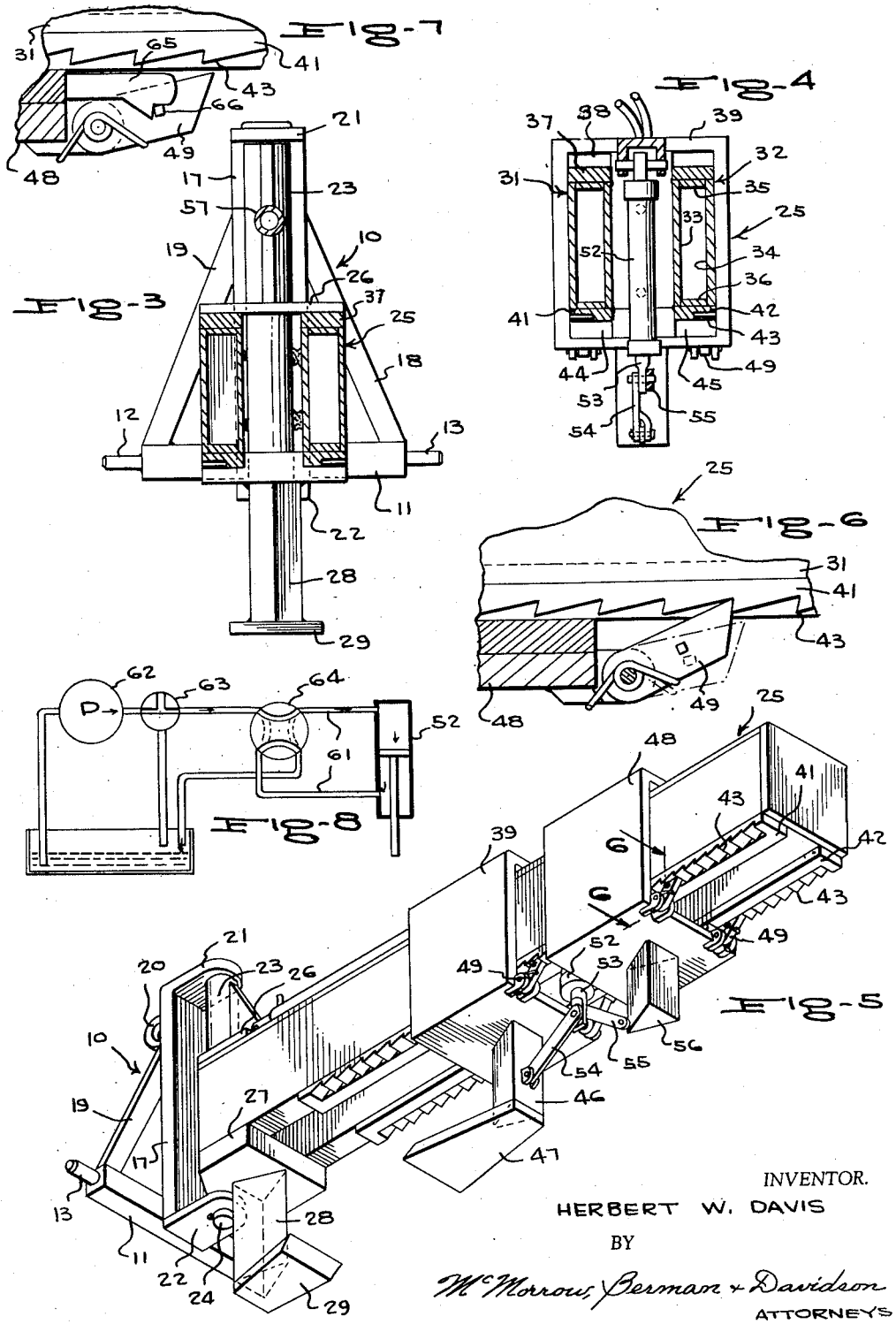
INVENTOR.
HERBERT W. DAVIS
BY
McMorrow, Berman & Davidson
ATTORNEYS United States Patent Office 2,820,493
Patented Jan. 21, 1958

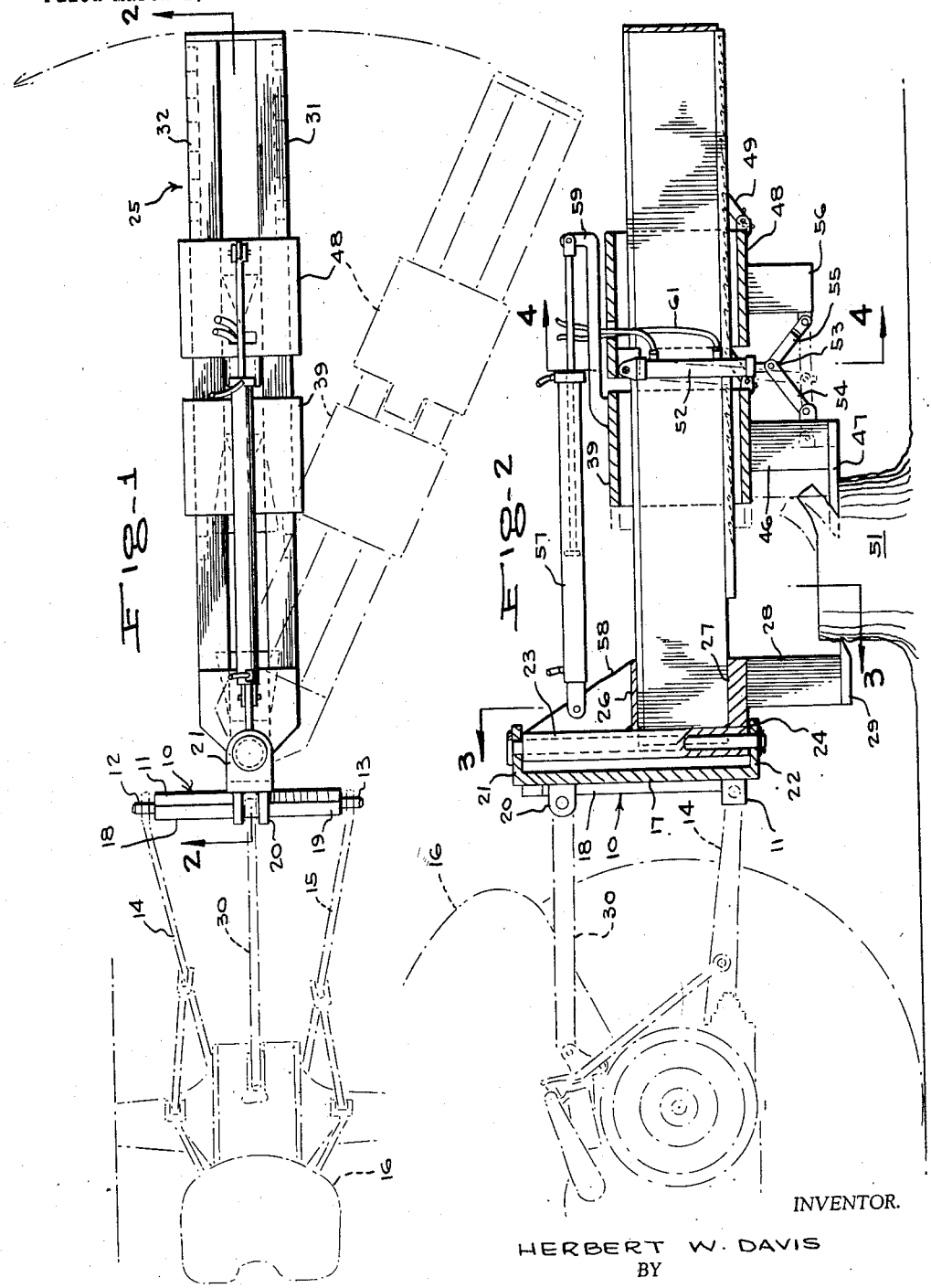

2,820,493

STUMP CUTTING ATTACHMENT FOR A TRACTOR

Herbert W. Davis, Hackettstown, N. J.

Application March 1, 1957, Serial No. 643,326

3 Claims. (Cl. 144—2)

The present invention relates to a stump cutting attachment for a tractor.

An object of the present invention is to provide a stump cutting attachment for a tractor which enables the user to quickly and efficiently cut stumps in a field to such a level below the ground surface as will permit the working and seeding of the ground surface by ground working and seeding implements.

Another object of the present invention is to provide a stump cutting attachment for a tractor having high stump cutting power and one which may be operated by one person in complete safety from the tractor seat.

A further object of the present invention is to provide a stump cutting attachment for a tractor which is simple in structure, sturdy in construction and economical to manufacture and assemble, and one which is highly efficient in action.

These and other objects and advantages of the present invention will be fully apparent from the following description when taken in connection with the annexed drawings, in which:

Figure 1 is a plan view of the stump cutting attachment according to the present invention, showing it attached to the hydraulic lift arms of the tractor, the lift arms and a portion of the tractor being shown in dotted lines and other dotted lines showing the swinging movement of the stump cutting attachment;

Figure 2 is a sectional view of the assembly shown in Figure 1, taken on the line 2—2 of Figure 1, showing the stump cutting attachment in a position of use cutting a stump;

Figure 3 is a sectional view, taken on the line 3—3 of Figure 2;

Figure 4 is a sectional view, taken on the line 4—4 of Figure 2;

Figure 5 is a perspective view of the stump cutting attachment removed from the tractor;

Figure 6 is a sectional view, on an enlarged scale, taken on the line 6—6 of Figure 5;

Figure 7 is a sectional view, similar to Figure 6, showing the detachable means for holding the pawl out of engagement with the ratchet teeth; and Figure 8 is a schematic view showing the hydraulic control for the stump cutting attachment of the present invention.

Referring in greater detail to the drawings, in which like numerals indicate like parts throughout the several views, the stump cutting attachment according to the present invention comprises an upstanding frame 10 consisting in a vertically disposed plate 11 having cylindrical end portions 12 and 13 each of a size to fit the open socket end of the adjacent hydraulic lift arms 14 and 15, respectively, of a tractor 16. The tractor 16 and the lift arms 14 and 15 are shown in dotted lines in Figures 1 and 2. The frame 10 includes a vertically disposed bar 17 having its lower end secured by welding or other means to the center part of the bar 11, and upwardly extending brace members 18 and 19 connecting the outer end portions of the bar 11 to the upper end of the bar 17. Rearwardly extending and horizontally disposed are plate members 21 and 22, on the upper and lower ends of the bar 17, respectively, which serve as bearing members for supporting a hollow vertically disposed spindle 23 circumposed about and rotatably supported on a shaft 24 which has its ends secured in the plate members 21 and 22.

A horizontally disposed beam 25 is arranged on the side of the frame 10 adjacent the bearing plate members 21 and 22 and extends longitudinally of the frame 10. To one end of the beam 25, on the upper and lower sides, respectively, are secured attaching plates 26 and 27, respectively, each having an end portion projecting beyond the adjacent end of the beam 25 and provided with means for the securement of the spindle 23 thereto.

To the underside of the plate 27 is secured a vertically disposed rigid support 28 extending below the beam 25 adjacent the end to which is attached the spindle 23. A horizontally disposed blade 29 projects transversely from the lower and free end of the support 28 and faces toward the other end of the beam 25.

The beam 25 is constructed of two parallel spaced box members 31 and 32, each fabricated, as seen in Figures 3 to 5, inclusive, of a plurality of elongated plates and bars suitably welded together, the box member 32 having, for instance, side plates 33 and 34 joined by a top bar 35 and joined by a bottom bar 36.

A bearing plate 37 extends longitudinally over each box member 31 and 32 and is frictionally engaged by the adjacent bearing plate 38 secured to the underside of the top of a hollow box-like carriage 39 which is mounted on the beam 25 intermediate the ends thereof for forward and backward movement therealong.

Other bearing plates 41 and 42 are dependingly carried by the box members 31 and 32, respectively, and are provided on one side thereof with a plurality of spaced ratchet teeth 43.

Supported on the bottom of the carriage 39 are bearing blocks 44 and 45 frictionally engaging the solid portions of the bearing plates 41 and 42, respectively, permitting sliding movement of the carriage 39 on the beam 25 without appreciable movement relative to the beam 25.

A vertically disposed rigid second support 46 is fixedly carried by the carriage 39 and extends below the carriage 39. A horizontally disposed blade 47 projects transversely from the free end of the support 46 and faces toward the blade 29.

A second carriage 48, constituting a releasable latch element, is slidably mounted on the beam 25 between the carriage 39 and the end of the beam 25 remote from the spindle 23. The construction of the carriage 48 is similar to that of the carriage 39 having suitable bearing blocks and bearing plates frictionally engaging the adjacent bearing plates 37, 41, and 42, associated with the beam 25.

A pivotally mounted pawl 49 is carried on each side of and adjacent the rearward end of each of the carriages 39 and 48, each pawl 49 being releasably engageable with the adjacent ratchet teeth 43 provided in the bearing plates 41 and 42.

Means is provided for effecting the step by step forward movement of the carriage 39 on the beam 25 so that the blade 47 approaches the blade 29 and may be used to sever a portion of a stump 51 while progressively cutting the stump 51 and removing the stump from the adjacent ground surface. Specifically, this actuating means consists in a double-ended hydraulic cylinder assembly 52 having the free end of an actuating arm 53 connected in a toggle joint between the adjacent ends of the bars 54 and 55. The outer ends of the bars 54 and 55 are pivotally connected to the rigid support 46 and to another support 56 which is dependingly carried from the underside of the carriage 48, respectively. Another hydraulic cylinder assembly 57 extends between a reinforcing web 58 and a support arm 59 secured to the upper side of the carriage 39 and is operable to return the carriages 39 and 48, as a unit, to the remote end of the beam 25 when it is desired to move the blade 47 away from the blade 29. The carriages 39 and 48 are connected together for limited movement relative to each other by the adjacent ends of the hydraulic cylinder assembly 52.

In operation, the hydraulic power system of the tractor 16 is connected by suitable hoses 61 to the hydraulic cylinder assembly 52, there being a fluid pump 62, Figure 8, a means control valve 63 and a reversing control valve 64 in such a system. Upon admission of hydraulic fluid under pressure to the hydraulic cylinder assembly 52 and downward movement of the actuating arm 53, the supports 46 and 56 are moved away from each other with the pawls 49 associated with the carriage 48 securely holding the carriage 48 against rearward movement on the beam 25. Due to the toggle joint connection of the actuating arm 53 with the bars 54 and 55, great pressure is applied to the support 46 to drive the blade 47 into the stump 51 to sever a portion thereof with the other blade 29 entering the stump 51 from the opposite side. The beam 25 may be swung from the full line position to the dotted line position in Figure 1 to completely cut portions of the stump 51 from one side of the stump 51 to the other. Suitable hydraulic connections are also made to the hydraulic cylinder assembly 57 to the hydraulic system of the tractor for applying fluid under pressure to the assembly 57 when it is desired to move the carriages 39 and 48 to a new position away from the blade 29. The pawls 49 of the carriage 48 constitute latching elements for securely holding the carriage 39 against rearward movement on the beam 25 during its step by step forward movement.

Means is provided for releasably holding the pawls 49 in a released position while the carriages 39 and 48 are moved to the free end of the beam 25. Specifically, this means consists in a keeper element 65, shown in Figure 7, the element 65 being completely removable from its position in which a notch therein is in engagement with a boss 66 projecting from one side of the pawl 49. A keeper element 65 is freely detachable from the adjacent portion of the carriage 39 or 48 and is only used to hold each of the pawls 49 in its released position during the free movement of the carriages 39 and 48 upon the beam 25.

It is intended that the stump cutting attachment according to the present invention may be used with a supporting vehicle other than a tractor having lift arms, in which case other support frame elements will be attached to the beam 25 for connection to such a vehicle for upward and downward movement. As here illustrated and described, the frame 10 extends across the free ends of the lift arms 14 and 15 with the upper end of the frame 10 secured by a pair of apertured lugs 20 to the centrally disposed positioning bar 30 of the implement hitch assembly of the tractor 16.

It will be seen, therefore, that by the use of the stump cutting attachment of the present invention, stumps may be cut by repeatedly positioning the blades 29 and 47 on opposite sides of a stump 51 and by actuation of the reversing control valve 64, cause hydraulic fluid to flow first in the one end of the hydraulic cylinder assembly 52 and then into the other end to effect the upward and downward movement of the actuating arm 53. This motion will cause the carriage 39 to first move the distance of one or two ratchet teeth 43, as desired, and then the step by step movement of the carriage 48 along the beam 25, the carriage 48 constituting a latching element for preventing the rearward movement of the carriage 39 while the blade 47 advances into the stump 51. The attachment of the frame 10 to the lift arms 14 and 15 enables the operator to lower the beam 25 to the desired position and enables the operator to control the cutting action of the blades 29 and 47 without leaving the tractor seat. The attachment of the blades 29 and 47 to the supports 28 and 46, respectively, permits the blades 29 and 47 to sever a stump at a level considerably below the ground surface, thereby removing the stump from the path of other soil working and seeding elements which may be used to put the ground surface into condition for agricultural use.

What is claimed is:

1. A stump cutting attachment comprising an upstanding frame adapted to be positioned so as to extend across the free ends of the lift arms of a tractor, means on one face of said frame for detachably securing the frame to the free ends of said lift arms, vertically spaced bearing members projecting from the other faces of said frame, a vertically disposed spindle rotatably supported in said bearing members, a horizontally disposed beam arranged on the side of said frame adjacent said bearing members and extending longitudinally with respect to said frame and having one end fixedly secured to said spindle, a vertically disposed rigid support fixedly carried by said beam and extending below said beam adjacent one end thereof, a horizontally disposed blade projecting transversely from the free end of said support and facing toward the other end of said beam, a carriage mounted on said beam intermediate the ends thereof for forward and backward movement therealong, a vertically disposed rigid second support fixedly carried by said carriage and extending below said carriage, another horizontally disposed blade projecting transversely from the free end of said second support and facing toward the first-named blade, and means operatively connected to said carriage for effecting the movement of said carriage.

2. A stump cutting attachment comprising an upstanding frame adapted to be positioned so as to extend across the free ends of the lift arms of a tractor, means on one face of said frame for detachably securing the frame to the free ends of said lift arms, vertically spaced bearing members projecting from the other face of said frame, a vertically disposed spindle rotatably supported in said bearing means, a horizontally disposed beam arranged on the side of said frame adjacent said bearing members and extending longitudinally with respect to said frame and having one end fixedly secured to said spindle, a vertically disposed rigid support fixedly carried by said beam and extending below said beam adjacent one end thereof, a horizontally disposed blade projecting transversely from the free end of said support and facing toward the other end of said beam, a carriage mounted on said beam intermediate the ends thereof for forward and backward movement therealong, said carriage being connected to said beam for step by step forward movement, a vertically disposed rigid second support fixedly carried by said carriage and extending below said carriage, another horizontally disposed blade projecting transversely from the free end of said second support and facing toward the first-named blade, and means connected to said carriage for effecting the step by step forward movement of said carriage.

3. A stump cutting attachment comprising an upstanding frame adapted to be positioned so as to extend across the free ends of the lift arms of a tractor, means on one face of said frame for detachably securing the frame to the free ends of said lift arms, vertically spaced bearing members projecting from the other face of said frame, a vertically disposed spindle rotatably supported in said bearing members, a horizontally disposed beam arranged on the side of said frame adjacent said bearing members and extending longitudinally with respect to said frame and having one end fixedly secured to said spindle, a vertically disposed rigid support fixedly carried by said beam and extending below said beam adjacent one end thereof, a horizontally disposed blade projecting transversely from the free end of said support and facing toward the other end of said beam, a carriage mounted on said beam intermediate the ends thereof for forward and backward movement therealong, said carriage being connected to said beam for step by step forward movement, a vertically disposed rigid second support fixedly carried by said carriage and extending below said carriage, another horizontally disposed blade projecting transversely from the free end of said second support and facing toward the first-named blade, a releasable latch element arranged on the portion of said beam between said carriage and the end of said beam remote from said first-named blade and connected to said carriage for forward and backward movement therewith along said beam when released, said latch element being connected to said beam for locking said carriage against backward movement during the execution of step by step forward movement of said carriage, and means carried by said beam operatively connected to said carriage for effecting the step by step forward movement of said carriage.

References Cited in the file of this patent

UNITED STATES PATENTS

| | | |
|---|---|---|
| 1,534,856 | McKoy et al. | Apr. 21, 1925 |
| 2,529,934 | Gracey et al. | Nov. 14, 1950 |
| 2,601,366 | Chapman | June 24, 1952 |